2,791,584

METHOD OF PREPARING CELLULOSE ETHERS QUICKLY SOLUBLE IN COLD WATER

Arthur W. Anderson, Midland, Mich., assignor to The Dow Chemical Company, Midland, Mich., a corporation of Delaware No Drawing. Application March 20, 1953, Serial No. 343,799

5 Claims. (Cl. 260—232)

This invention relates to a method of preparing an improved form of cellulose ethers which are insoluble in hot water and soluble in cold water and particularly to a method of preparing the same in a form which dissolves readily in cold water.

Some cellulose ethers, such as methyl cellulose, are insoluble in hot water but are ordinarily described as being soluble in cold water. Such materials when first prepared are in a fibrous form, and they must be treated with hot water for as much as 20 to 30 minutes before they can be satisfactorily dispersed or dissolved in cold water. Such fibrous cellulose ethers, which can be dissolved in water, even though with difficulty, are hereinafter referred to as cold-water-soluble cellulose ethers. The indirect procedure just referred to for preparing cold water solutions of the cold-water-soluble cellulose ethers is obviously time consuming, expensive and otherwise disadvantageous in many manufacturing operations wherein aqueous compositions comprising these ethers are required. Attempts have been made in the past to grind, shred, or otherwise to subdivide the ethers to increase the rate of dissolving. However, the fibrous forms of the cellulose ethers are difficult to grind or shred and the finely divided material is little, if any, more easily dissolved than the unground material. In U. S. Patent 2,331,864 a method is disclosed for converting the fibrous forms of the cellulose ethers into a form which may be ground, and after grinding show an increased solubility over that of the unground material. In that method, a wet mixture of a fibrous cold water soluble cellulose ether and water is prepared and maintained at a temperature below 50° C. until a translucent mass is formed which, after drying, is ground. The grinding rates of the products made by that method are low and the bulk densities of the ground product are also low.

It is an object of this invention to provide a method whereby potentially cold-water-soluble cellulose ethers may be converted to a form readily and directly soluble in cold water.

A further object is to provide a method of preparing cold-water-soluble cellulose ethers in a form more easily subdivided into dry powders.

An additional object is to provide a method of preparing the aforementioned cellulose ethers as dry, free-flowing, non-caking powders with an apparent density greater than that of the forms heretofore available.

The objects of this invention are accomplished by forming a wet mixture comprising from 35 to 2 percent of a fibrous cold-water-soluble cellulose ether and from 65 to 98 percent by weight of hot water at a temperature above the gel point of the cellulose ether, cooling the mixture below the gel point until the fibrous structure disappears, raising the temperature to a point above which syneresis occurs, then maintaining the mixture at a point above the gel point until dry, and converting the dried product to a powder.

The amount of cellulose ether that may be employed is limited further by the solubility of the ether and by the workability of the gel. Aqueous solutions containing up to 35 percent by weight of a low viscosity type methyl cellulose may be prepared, but such solutions are impossible to prepare from the very high viscosity types of methyl cellulose. (Water-soluble cellulose ethers are rated according to the viscosity of their 2 percent solutions in water at 20° C.)

The terms dissolve and solution have the meanings herein commonly associated with such terms in the cellulose ether art. Thus, cellulose ethers are said to dissolve if a clear transparent mass is obtained.

Although any cold-water-soluble fibrous cellulose ethers such as certain ethyl celluloses, methyl hydroxy propyl cellulose, may be converted by the method of the present invention to a form easily dissolved in cold water, for the sake of simplicity the description of the invention will be directed primarily to its application to the preparation of methyl cellulose in such form.

The wet fibrous methyl cellulose to be used in the present method may result from an operation wherein freshly prepared methyl cellulose is washed with hot water to free it from water-soluble impurities, or it may be prepared from a commercial fibrous product by making a uniform slurry of from 1 to 5 percent by weight of methyl cellulose in hot water and subsequently removing the excess water, as by pressing or by filtering under vacuum until only the desired proportion of water is retained in the methyl cellulose. Although the methyl cellulose may be treated with hot water in the above or equivalent manner at any temperature above 50° C., the treatment is preferably carried out at above 70° C., since by so doing, a more uniform distribution of the water throughout the mass of the methyl cellulose appears to be obtained. The treatment with hot water may be carried out at superatmospheric pressure if desired. Although the optimum water content of the water wet methyl cellulose depends to some extent upon the properties of the particular methyl cellulose employed, the useful range is generally from 65 to 98 percent water, and preferably from 75 to 90 percent water.

The wet heat-swollen fibrous methyl cellulose is cooled to a temperature below its gel point and preferably to from 15° C. to 20° C. The mixture may be stirred to facilitate dissolution of the fibers. The cooling should take place under conditions that will not cause dehydration of the gel. The progress of the dissolution may be observed visually. At first the mass has the appearance of a mat of white fibers. As dissolution proceeds, the mat becomes slightly grayish in appearance followed by the disappearance of any fibrous structure. Finally, when the fibers are completely dissolved, the gel becomes transparent, although, if stirring is employed, some translucence due to entrapped air bubbles may be noticed. The degree and duration of mixing required for dissolution will vary depending on the viscosity of the methyl cellulose employed and on the temperature used. It is well known that low viscosity grades of methyl cellulose will dissolve more easily than will high viscosity materials.

The fiber-free gel is then heated at a uniform rate, preferably with stirring, to a temperature at which syneresis occurs, and preferably 20° to 30° C. above this temperature. It is recognized that if the temperature of a methyl cellulose solution is raised slowly to the gel point, the formation of the gel takes place over a range of temperature rather than suddenly, and the point at which syneresis occurs is approximately 10° to 20° C. higher than the temperature range at which the gel forms. For example, if the gel point ranges from about 45° C. to 50° C., the point at which syneresis occurs is from about 55° C. to 70° C. Materials which gel at lower temperatures also synerize at a lower temperature.

The heating to the syneresis point must take place without much evaporation of water. When large amounts of water are removed prematurely, the mass is dried before syneresis can occur and the products have lower bulk densities than desired and are more difficult to grind.

The water that is separated from the mass by syneresis may be removed by any of several known methods. In some cases the water is visibly free and may be decanted. In other cases it may be necessary to remove the excess water in a heated centrifuge, being careful that the temperature of the mass does not fall below the gel point of the cellulose ether. Still another method is to dry the synerized mass, without prior removal of the liquid phase, under conditions that the water is removed without the temperature falling below the gel point of the cellulose ether. The best results are obtained when the greatest possible amount of water is removed by decanting, centrifuging, or other mechanical methods before drying is started.

The gelled material is then dried at a temperature above the gel point. It is important that this temperature be maintained throughout the drying so that redissolution does not occur.

The dried product is then reduced to the desired particle size. This may be accomplished by grinding or any other known method.

The method of the invention will be made more apparent from the following examples which are intended to be illustrative only.

*Example 1*

A 10 percent slurry in hot water of fibrous methyl cellulose was cooled with mixing from about 80° C. to about 18-20° C. to give a thick dough. (The methyl cellulose was one whose 2 percent solution in water at 20° C. had a viscosity of 8000 centipoises.) When the fibers disappeared, the dough was heated in a water jacketed mixer with water at 80° C. in the jacket until the temperature of the batch was raised uniformly to about 55° C. to 60° C. The water in the jacket was then replaced with steam which raised the temperature of the batch to 90° C. At this point free water was visible indicating that syneresis had occurred. The batch was then placed in a heated basket centrifuge and the water content was reduced to about 70 percent. Without allowing the temperature to drop below the gel point, the batch was transferred to an oven at 140° C. to dry.

The dried material was ground first through a ¼ inch screen to reduce it to a convenient size, then ground through a 0.027 inch screen in a laboratory "Mikropulverizer." Approximately 98 percent of the product passed through a 42 mesh sieve and its bulk density was 0.67 gms./cc.

*Example 2*

A 25 percent slurry of a fibrous methyl cellulose in hot water was cooled to a fiber-free condition as in Example 1. (The methyl cellulose was one whose 2 percent solution in water at 20° C. had a viscosity of 10 centipoises.) The batch was then heated until the temperature of the batch was about 90° C. The material was immediately transferred to an oven at 140° C. to dry. The dried product was ground as in Example 1 so that 92 percent passed through a 42 mesh screen. The grinding rate was 4.23 lbs./hr. of material passing through the 42 mesh screen. The bulk density of the ground product was 0.75 gms./cc.

*Example 3*

A 25 percent slurry of 25 cps. methyl hydroxy propyl cellulose in hot water was cooled as in Example 1 until non-fibrous. The batch was then heated in a jacketed vessel with agitation until the temperature rose to 90° C. and was then dried in the agitated vessel at 140° C. The dried product from the agitated vessel was in the form of a fine powder that required no further grinding. Its bulk density was near .7 gram per cubic centimeter.

When cold-water-soluble cellulose ethers are treated according to the method of this invention a dry, free-flowing powder is obtained with a higher bulk density than was previously obtainable. Also, the rates for grinding the dried cellulose ethers into powders are greatly increased over any before obtainable. The results obtained by this method are compared in Table 1 with the results obtained by the method disclosed in U. S. Patent 2,331,864. Grinding rates are reported for the same apparatus in each case.

TABLE 1

| Method | Viscosity of Cellulose Ether (2% in water at 20° C.) | Bulk Density (gms./cc.) | Grinding rate (lbs./hr.) |
| --- | --- | --- | --- |
| U. S. Patent 2,331,864 | 10–15 cps | 0.35 | 1.36 |
|  | 8,000–9,000 cps | 0.45 | 0.57 |
| This invention | 10–15 cps | 0.75 | 4.23 |
|  | 8,000–9,000 cps | 0.67 | 3.30 |

With the method of this invention dry, free-flowing powders with bulk densities of about 0.7 gms./cc. for all viscosity types of cellulose ethers are possible. With previous methods of preparing cellulose ether powders, the bulk density was dependent on and thus varied with the viscosity type of the cellulose ether.

I claim:

1. A method of improving the solubility and increasing the bulk density of a cold-water-soluble cellulose ether which comprises forming a mixture of from 2 to 35 percent by weight of a fibrous cold-water-soluble and hot water insoluble cellulose ether and from 98 to 65 percent of water at a temperature above the gel point of the cellulose ether, cooling the mixture to a temperature below its gel point until the fibrous structure has substantially disappeared and the mass has become transparent, heating the mass to above its syneresis temperature, then drying the mass without allowing the temperature to drop below the gel point, and reducing the dried product to the desired particle size.

2. The method claimed in claim 1, wherein the wet fibrous mass is cooled to and held at a temperature near 15° to 20° C. until the fibrous structure has substantially disappeared and the mass has become transparent.

3. The method claimed in claim 1, wherein the no-longer-fibrous mass is heated to a temperature from 10 to 20 centigrade degrees above its gel point until syneresis occurs and the separated water phase is removed before the residual mass is dried.

4. The method claimed in claim 1, wherein the cellulose ether is methyl cellulose.

5. The method claimed in claim 1, wherein the cellulose ether is methyl hydroxypropyl cellulose.

References Cited in the file of this patent

UNITED STATES PATENTS 2,331,864   Swinehart et al. _____ Oct. 12, 1943